United States Patent [19]

Focht

[11] 4,073,991
[45] Feb. 14, 1978

[54] PERFORATED, EMBOSSED FILM TO FOAM LAMINATES HAVING GOOD ACOUSTICAL PROPERTIES AND THE PROCESS FOR FORMING SAID

[75] Inventor: Bruce E. Focht, Trainer, Pa.

[73] Assignee: Scott Paper Company, Philadelphia, Pa.

[21] Appl. No.: 733,277

[22] Filed: Oct. 18, 1976

Related U.S. Application Data

[63] Continuation of Ser. No. 476,216, June 4, 1974, abandoned.

[51] Int. Cl.$^2$ .......................... B32B 3/24; B32B 3/30; E04B 1/84
[52] U.S. Cl. ..................... 428/138; 52/145; 156/209; 156/220; 181/288; 181/DIG. 1; 296/137 A; 428/158; 428/159; 428/160; 428/161; 428/163; 428/164; 428/182; 428/311; 428/315; 428/321
[58] Field of Search ............... 428/158, 159, 160, 161, 428/163, 164, 167, 138, 316, 315, 321; 181/DIG. 1, 33 G, 33 GA; 156/220, 252, 253, 209; 264/280, 321; 296/137 A; 52/145

[56] References Cited

U.S. PATENT DOCUMENTS

| | | | |
|---|---|---|---|
| 2,967,583 | 1/1961 | Jack | 52/144 |
| 3,160,549 | 12/1964 | Caldwell | 181/33 G |
| 3,712,846 | 1/1973 | Daniels et al. | 428/138 |
| 3,770,560 | 11/1973 | Elder et al. | 181/33 G |
| 3,848,043 | 11/1974 | Garrick et al. | 264/134 |

FOREIGN PATENT DOCUMENTS

| | | | |
|---|---|---|---|
| 721,251 | 11/1965 | Canada | 428/138 |
| 848,511 | 9/1960 | United Kingdom | 428/159 |

*Primary Examiner*—J.C. Cannon
*Attorney, Agent, or Firm*—Nicholas J. DeBenedictis; John W. Kane; William J. Foley

[57] ABSTRACT

An embossed film-to-foam laminate is provided having perforations through the film selectively distributed essentially along the sidewalls and valleys of the embossed pattern. The integrity of the laminated film material is retained on the crowns of the embossed patterned surface, since the perforations in the film material are mainly distributed on the sidewalls and valleys of the embossed pattern. The laminated product has a water-resistant and abrasion-resistant upper surface imparted by the film material on the crowns while the perforations in the sidewalls and valleys permit sound to pass through the film and be exposed to the acoustical matrix of the open cell foam component of the laminate. The film and/or the foam material are heated to supply adhesive material by melting or softening which serves to bond the film material to the foam.

5 Claims, 5 Drawing Figures

PERFORATED, EMBOSSED FILM TO FOAM LAMINATES HAVING GOOD ACOUSTICAL PROPERTIES AND THE PROCESS FOR FORMING SAID

This is a continuation of application Ser. No. 476,216, filed June 4, 1974, now abandoned.

BACKGROUND OF THE INVENTION

1. Field of the Invention

Figure 1:
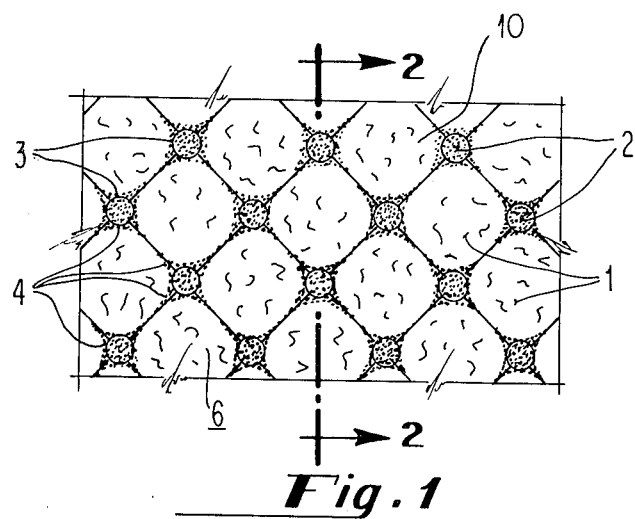
FIG. 1 is a top view of the laminated product.

This invention concerns embossed foam-to-film laminates.

2. Description of the Prior Art

Flexible, open cell foam is known to have good acoustical properties. For many uses of such acoustical foam, such as wall panels, increased durability and aesthetics are desired. Previous attempts to increase the durability and abrasion resistance of acoustical foam including laminating a protective sheet to the surface of the foam. However, the placing of a protective sheet in front of a good sound absorbing foam significantly impaired the sound absorbing properties of the acoustical foam. Examples of foam-to-sheet laminates are contained in U.S. Pat. Nos. 3,454,413, issued July 8, 1969 to Philip Miller and 3,425,882, issued Feb. 4, 1969 to Albert L. McConnell et al. In addition to laminating a cover sheet to the foam, such processes also imparted an embossed pattern to the foam by a procedure known as "masking" during heat lamination. However, the sheet material was not adhered to the foam at many locations because of the presence of a masking fluid. The abrasion resistance of such a laminate is much less because of the absence of adhesive in parts of the embossed pattern.

Prior art relating to embossed, perforated laminates but not concerning laminates having an acoustical foam backing is disclosed in U.S. Pat. No. 3,292,619. Also, embossed foam rubber-to-fabric laminates are disclosed in U.S. Pat. No. 2,752,279. However, in that disclosure the perforations continue through the foam with the sidewalls of the perforations covered by the film thereby impeding sound penetration into the foam.

SUMMARY OF THE INVENTION

A perforated and embossed film-to-foam acoustical product is provided comprising a protective film embossed and laminated to an acoustical foam backing. The embossed pattern is composed of crowns, valleys, and sidewalls connecting the crowns and valleys. The upper surface of the acoustical foam is contoured according to the embossed pattern and the protective film is adhesively attached to the upper surface of the acoustical foam and conforms to the embossed pattern. The film material is perforated essentially on the sidewalls and valleys of the embossed pattern while the top surface of the laminate defined by the crowns of the embossed pattern is substantially impervious to liquids and resists abrasion because the film on the crowns is essentially without perforations and adhesively attached to the acoustical foam backing. Preferably, the film is heat-deformed to generally contour to the cellular surface structure of the foam, especially on the crowns of the embossed pattern. The depth of the valleys is substantially less than the foam thickness, usually from 1/20 to ¼ of the foam thickness. The laminate is useful as a sound absorbing surface such as a wall panel, a headliner in a motor vehicle passenger compartment, or in similar uses requiring an acoustical surface that is abrasion resistant and has an upper surface that is cleanable with liquids.

DESCRIPTION OF THE PREFERRED EMBODIMENT OF THE INVENTION

The perforated, embossed, acoustical laminate can be produced by a process comprising the steps of contacting a deformable film with a surface of an open cell acoustical foam, adhesively activating with heat either the film or the surface of the foam, mechanically pressing and embossing the deformable film at an elevated temperature into the surface of the foam in a predetermined embossing pattern and setting the adhesive film and/or foam material by cooling to bond the laminate (usually accomplished when the laminate cools to about room temperature after embossing).

Any flexible open cell foam material may be employed in practicing this invention and preferably can be adhesively activated upon exposure to heat, including both foam type thermoplastic resins and foam type elastomers. Examples of such suitable open cell foams are polyether or polyester based urethane foams and foams from vinyl polymers such as polyvinyl chloride and its copolymers. Many different types of flexible open cell foams having acoustical properties are known and the selection of any particular one is not critical to the practice of this invention and well within the abilities of those possessing ordinary skill in the foam art.

The thickness, density, cell pore size and degree of cell openness of the foam are capable of wide variations with the selection of specific values for these parameters being dictated by the desired end use of the product with specific emphasis upon the acoustical properties desired. particularly preferred are acoustically controlled foams such as flexible, open cell polyurethane foams especially those having a pore size from 40 to 90 PPI and a density from 1.5 tp 6 lbs./ft.$^3$.

The film material can be any deformable nonwoven substantially water impenetrable film such as plastic sheet or even a metal foil such as aluminum foil. The selection of a specific film material in combination with the thickness of the film sheet must be such that the film will deform and perforate under the mechanical pressure and elevated temperature encountered in the embossing step. Suitable film material include any of the well-known thermoplastic and thermoset film forming materials that can be mechanically and/or thermally deformed into the valley areas of the embossed pattern and which preferably soften sufficiently during embossing to adhesively bond to the foam. Examples of suitable thermoplastic film materials are natural substances such as crude rubber and synthetic materials suh as polyvinyl chloride, nylons, fluorocarbons, linear polyethylene, polyurethane prepolymer, polystyrene, polypropylene, cellulose acetate, cellulose nitrate and acrylic resin. Thermoset materials undergo some softening under mild heating prior to thermosetting or rigidification (usually caused by cross-linking) and are therefore suitable. Precautions should be taken to prevent thermoset material from setting prior to embossing (which can be easily controlled by adjusting embossing temperature and time). Examples of suitable thermoset film materials are polyesters such as MYLAR ®, amino resins and silicones. Metal foils are also sufficiently deformable to be suitable for use as the film material especially the metals which soften more readily when exposed to heat such as aluminum, aluminum alloy, tin and tin alloys. Preferred film materials are polyesters, polyethylene, polyvinyl chloride, polypropylene, polyurethane, cellulose acetate, cellulose nitrate polystyrene and similar elastomeric materials. Particularly preferred is polyurethane film.

The sheet of deformable film material can vary in thickness with the selection of any particular thickness depending upon considerations such as the durability and cleanability of the laminate surface desired, the plasticity of the material selected at elevated temperatures and the malleability of the material selected. The embossing of the deformable film material into the valleys of the foam is accomplished by mechanically impressing the embossed pattern into the sheet material and foam simultaneously at elevated temperatures. In this way, the film material is both mechanically and thermally deformed into the valley areas during embossing which, for practical and economic considerations, dictates a thin film thickness which facilitates the mechanical deforming of the film during embossing at the slight elevated embossing temperatures employed. This practical thickness varies depending upon the film material selected and would usually be in the area of a fraction of a mil (e.g., 1/10 mil) to about 20 mils thick with from about 4 to about 8 mils preferred.

Figure 5:
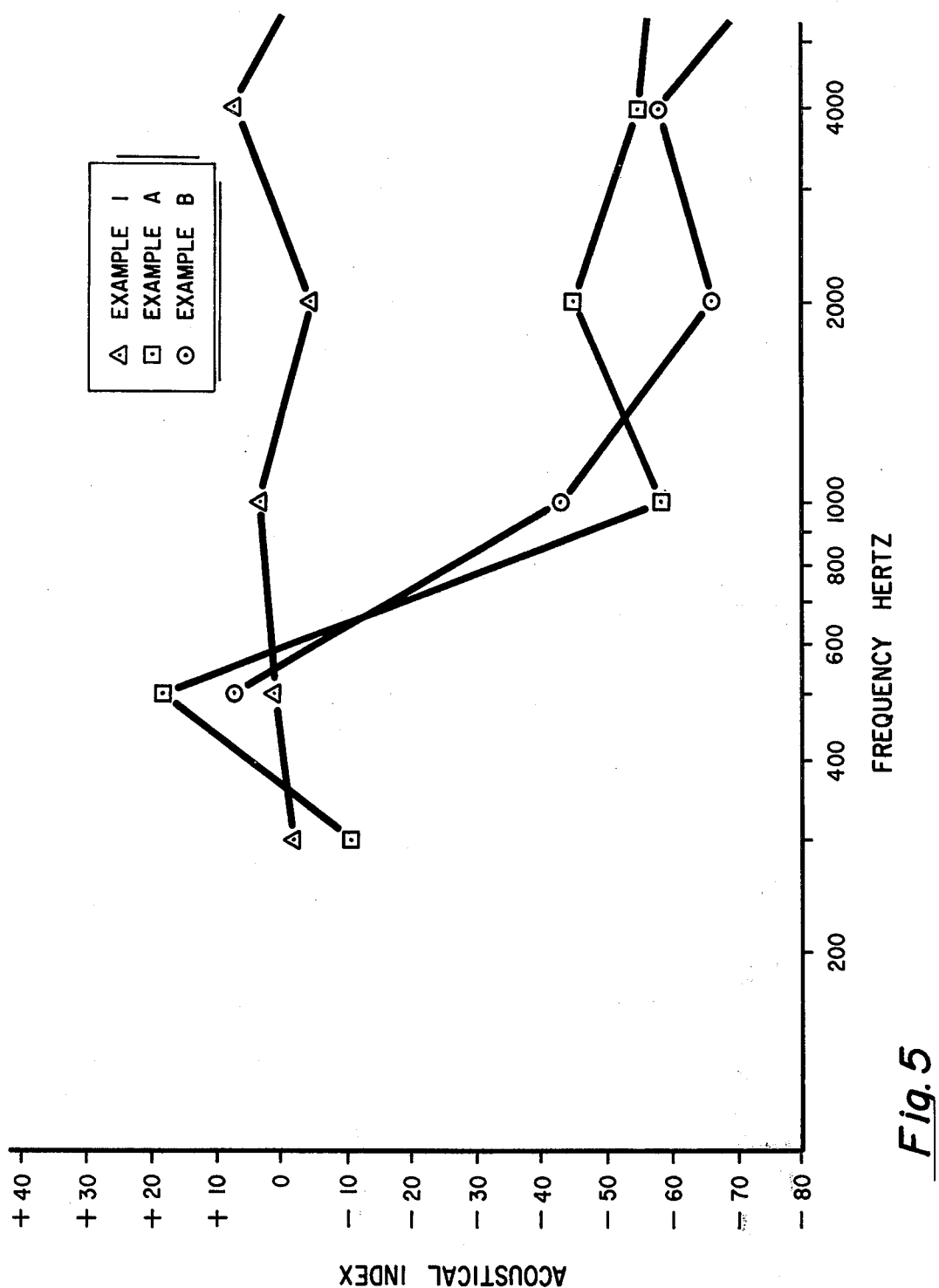
FIG. 5 graphically depicts data contained on Table II.

Normally, when placing such a film surface in front of a good sound absorber such as the flexible open cell foam material employed, the good sound absorbing properties of the open cell foam is significantly reduced. This reduction in good sound absorbency is substantially eliminated by the present invention as shown in FIG. 5.

The embossing pattern can vary greatly, it being only necessary that the pattern contain crowns and valleys interconnected by sloping sidewalls with the depth of valleys and the slopes of sidewalls being sufficient to cause the film material to be perforated during the embossing step. Specific depths and slope angles can vary significantly because particular selections which will result in perforations during embossing are interdependent with other parameters such as thickness and malleability of the film material employed, the temperature of the film material achieved during embossing, the speed and the mechanical pressure of the embossing rolls because all of these parameters affect the perforations obtained during embossing. Those possessing ordinary skill in the art and enlightened by the present disclosure could readily select among these parameters an operable combination of embossing pattern, sheet material, foam, embossing temperature, speed and pressure that will result in the visible perforations predominantly on sidewalls and valleys of the laminated product. Higher embossing temperatures will also thermo-deform the sheet material and/or the foam especially on the crowns of the embossed pattern to cause the film material to contour to the cellular structure defining the surface of the foam. Specific combinations of embossing patterns, embossing depth, embossing temperature, film material and thickness are demonstrated in the examples.

The novel and advantageous characteristics of the embossed laminate provided by this invention can be best understood with reference to the figures. FIG. 1 is a plain view of the laminated surface and shows the crown area 1 of the embossed pattern, the deep recesses (valleys) 2 and the sidewalls 3 of the embossed pattern. The perforations 4 are shown on the sidewalls and valleys. The film 6 is shown with the textured or patterned effect 10 on the crowns 1 caused by the deforming of the film to the cellular structure of the foam.

Figure 2:
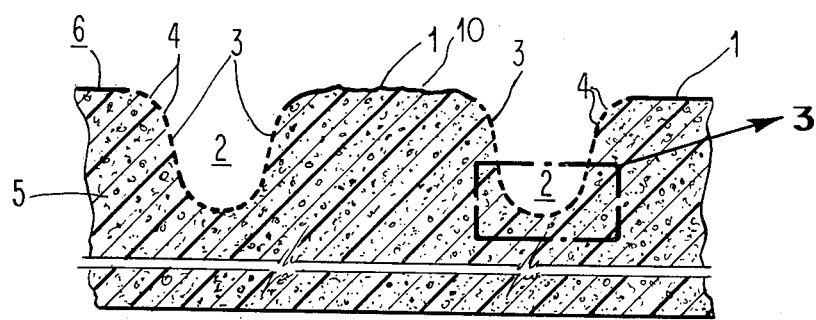
FIG. 2 is a sectional view along line 2—2 of the product of FIG. 1.

FIG. 2 is a sectional view along line 2—2 of the laminated product shown in FIG. 1 and shows a sideview of the laminate. The valleys of the embossed pattern 2 and their depth below the crowns 1 can be seen in this view. The steep slope of the sidewall 3 is also shown, which is a preferred embodiment for the embossing pattern because steep long sidewalls increase the amount of stretching and deformation the film undergoes during embossing which increases the tearing and perforations of the film along the sidewalls and valleys. Despite the tearing and perforating of the film, structural integrity is maintained on the crowns. The perforations 4 are also shown randomly dispersed on the sidewalls and valleys of the embossed pattern impressed into the foam 5. The upper surface of the foam and the film 6 defined by the crown is water resistant because essentially all of the perforations are on the sidewalls and valleys.

Figure 3:
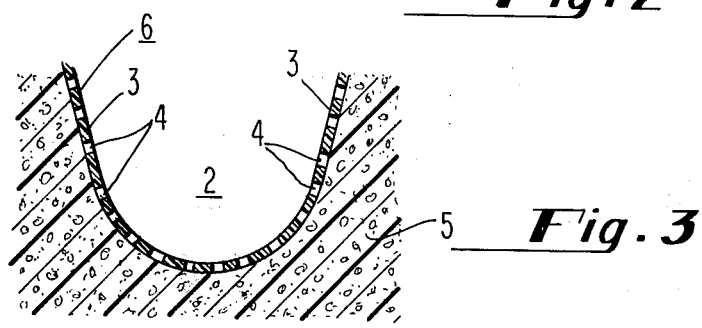
FIG. 3 is an enlargement of the valley and its adjoining sidewalls of the embossed pattern shown in block 2 of FIG. 2.

FIG. 3 is an enlargement of the area shown in box 2 of FIG. 2 and clearly shows the perforations 4 on the sidewalls and valleys.

Figure 4:
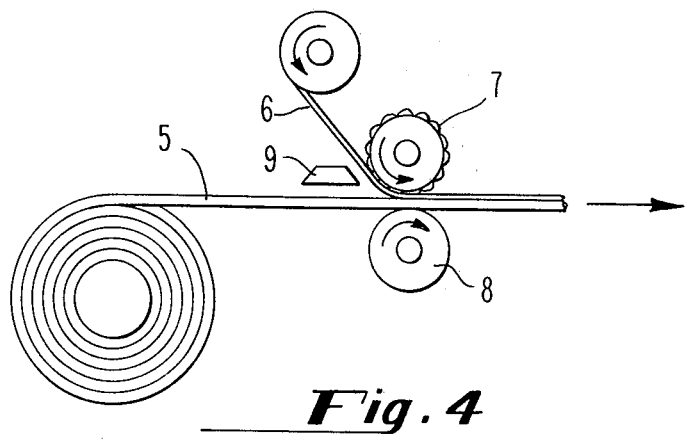
FIG. 4 schematically depicts a process for producing the product of FIG. 1.

FIG. 4 depicts a process for producing the laminate in which foam 5 is fed from a roll past a heat source 9 and through embossing rolls 7 and 8. The plastic film 6 is fed from a roller through the embossing rolls 7 and 8 while contacting the top surface of the foam. The desired pattern to be embossed is reproduced on the upper embossing roller 7 but in reverse (the valleys of the embossing pattern correspond to crowns on the embossing roller). A heat source 9 adhesively activates the top surface of the foam and/or the lower surface of the film. The heat source could be the embossing roller 7 itself. Thermo-deformable film will contour to the cellular structure of the foam during the embossing step which produces a slight irregularity to the film surface particularly on the crowns as seen in FIG. 1, item 10.

FIG. 5 graphically compares the present invention with plain foam to film laminates (smooth) and foam to film embossed laminates but without perforations (perforations masked with paint).

EXAMPLE I

A 70 pore per inch (ppi) flexible open cell polyurethane foam sheet about 1 inch thick was passed through embossing rolls as shown in FIG. 4 at a speed of about 35 feet per minute. Simultaneously, a sheet of 4 mil thick TUFTANE ® film (a polyester based urethane film having a specific gravity of 1.21 and containing antioxidant and ultraviolet stabilizers sold by B. F. Goodrich Chemical Company as TF-312) was fed through the embossing rolls while contacting the top surface of the foam. The upper embossing roll was heated to a temperature of about 480° F. and a contoured surface so as to emboss a rosette pattern into the film and foam. The contour pattern on the roller consisted of about 25 protrusions per square inch having a depth of about 0.06 inches (hill to valley), said protrusions comprising approximately about 5% of the surface area of the roll and impress a corresponding depression or valley into the film and foam during embossing. The resulting embossed laminate had a tough flexible top surface comprising the TUFTANE ® film strongly bonded to the foam material and containing perforations essentially along the sidewalls and valleys of the embossed pattern impressed into the laminate by the upper embossing roll. The perforations numbered about 250 to 350 per square inch and were mostly visible. The upper surface of the laminate defined by the crowns of the embossed pattern was abrasion resistant and water-resistant (it could be wiped vigorously with a wet cloth along the upper surface defined by the crowns without a significant penetration of water into the foam). The acoustical properties of the foam base (reverse side of the product) and the acoustical properties of the embossed and perforated laminated surface of the product were tested according to ASTM Test C-384-58 entitled "Standard Method of Test For Impedence and Adsorption of Acoustical Materials by the Tube Method" at frequencies of 0.3, 0.5, 1.0, 2.0, 4.0 and 6.4 Kilo Hertz. Results of the tests are listed in Tables I and II and are reported as per cent acoustical adsorption (Table I) and acoustical index (Table II). This test and the acoustical adsorption of the material is mainly a surface phenomenon and, therefore, the acoustical properties of both the laminate side and the base foam side of the product were tested employing a single sample of the laminated product and first testing the embossed and perforated laminated side and then reversing the product to test the acoustical properties of the foam base. This procedure insured that the acoustical test data for the foam base eliminated any difference or variations in the acoustical properties of the foam from one section of a sheet to another section of the sheet.

EXAMPLES 2-10

The procedure of Example 1 was repeated with different foam backing materials and different film materials. Examples 2-10 differ from Example 1 in the following aspects: the pore size of the foam was changed in Examples 2 and 3 from 70 ppi. to 60 ppi. (Example 2) and 50 ppi. (Example 3); Examples 4, 5, 6, and 7 duplicate Example 1 and are intended to show that while absolute values and the acoustical absorption may vary due to differences between foam samples, the acoustical index is consistently comparable and, therefore, the experimental data is significant; Example 8 employs foam differing from the foam of Example 1 in that the foam was treated prior to embossing according to a process that fully reticulated the foam (dewindowed) but retained the 70 ppi. pore size; Example 9 employed the same foam as Example 1 but used a ½ mil thick smooth aluminum foil as the deformable film material; Example 10 employed a ½ mil thick texturized aluminum foil as the deformable film material.

The acoustical performance of the embossed and perforated laminate of Examples 1-10 is reported in Tables I and II.

COMPARATIVE EXAMPLES

Comparative Example A employed the same foam and film material of Example 1 but the laminated product was produced by smooth rolls rather than employing an upper embossing roll. This produced a nonembossed, nonperforated laminate with the TUFTANE ® film material conforming to the cellular structure of and adhesively attached to the foam material. Comparative Example B employed the same foam and film material and the same embossing rolls as Example 1. However, the embossed laminate product of Comparative Example B differed from the product of Example 1 in the absence of perforations. In order to exactly duplicate the embossing pattern with the same materials of Example 1, the perforations could not be avoided even with adjustments in the thickness of the film material and the temperature of the embossing roll and, therefore, in order to produce the nonperforated embossed laminate for Comparative B, the perforations were closed by painting the embossed surface of Comparative B (five coats of paint required to close the perforations).

EXAMPLE 11

The procedure of Example 1 was repeated with the same foam and film material but employing an embossing roll having a diamond type pattern consisting of elongated diamond shaped protrusions on the upper embossing roll having a height of 0.050 inches and spaced approximately 0.075 inches apart with approximately 27 protrusions per square inch of the embossing roll. The product was tested for its acoustical properties and the results reported in Table I.

The best mode presently contemplated for practicing the present invention is by embossing a polyurethane film about 5 mils thick to a flexible open cell polyurethane foam having a pore size of about 70 ppi. and a thickness of from about ⅛ inch to about 3 inches thick and employing an embossing pattern having a difference in height between valleys and crowns of about 0.060 inches and with a sufficient number of crowns and valleys per square inch of laminated product to result in at least 10 and perferably between 100 and 1500 visible perforations per square inch of product. By visible perforations, as used herein, is meant perforations that can be seen with an unaided eye, especially when the product is delaminated and the film is viewed with a light source on the opposite side of the viewer so as to highlight the perforations.

Significance: The data reported in the Tables shows the acoustical performance of the present invention in that the acoustical benefits of the foam backing are essentially retained while a water and abrasion resistant top surface is provided which usually interferes with acoustical adsorption (see Comparative A). Table I contains the percent sound adsorption at various frequencies in Kilo Hertz for both the foam backing and the laminated surface. In order to eliminate acoustical differences between apparently similar foams, an acoustical index was calculated from the sound adsorption data in Table I. The acoustical index equals the percent sound adsorption of the foam backing minus the percent sound adsorption of the laminate surface. An acoustical index of zero indicates perfect reproduction of the acoustical properties of the foam backing while a negative index indicates a reduction in sound absorption and a positive index indicates improvement.

TABLE I

| Example No. | Acoustical Properties — Frequency in kHz ||||||||||||
|---|---|---|---|---|---|---|---|---|---|---|---|---|
| | Base Foam |||||| Laminate ||||||
| | 0.3 | 0.5 | 1.0 | 2.0 | 4.0 | 6.4 | 0.3 | 0.5 | 1.0 | 2.0 | 4.0 | 6.4 |
| 1 | 18 | 25 | 68 | 98 | 76 | 94 | 16 | 26 | 71 | 93 | 83 | 89 |
| 2 | 15 | 22 | 53 | 98 | 72 | 95 | 18 | 26 | 65 | 98 | 75 | 93 |
| 3 | 13 | 21 | 60 | 96 | 82 | 91 | 15 | 22 | 64 | 96 | 84 | 96 |
| 4 | 21 | 35 | 85 | 83 | 84 | 88 | 22 | 33 | 83 | 77 | 85 | 89 |
| 5 | 16 | 26 | 71 | 96 | 76 | 89 | 20 | 30 | 74 | 94 | 77 | 87 |
| 6 | 13 | 21 | 60 | 96 | 82 | 91 | 15 | 22 | 64 | 96 | 84 | 96 |
| 7 | 19 | 28 | 92 | 71 | 70 | 80 | 25 | 45 | 89 | 80 | 72 | 70 |
| 8 | 12 | 12 | 16 | 26 | 52 | 52 | 15 | 20 | 34 | 60 | 73 | 47 |
| 9 | 15 | 30 | 73 | 70 | 44 | 48 | 30 | 64 | 61 | 37 | 56 | 42 |
| 10 | 14 | 22 | 49 | 95 | 75 | 98 | 23 | 33 | 76 | 85 | 68 | 69 |
| 11 | 15 | 22 | 50 | 90 | 74 | 95 | 24 | 28 | 63 | 95 | 75 | 98 |
| Comp. A | 22 | 38 | 86 | 95 | 77 | 78 | 15 | 56 | 28 | 40 | 22 | 21 |
| Comp. B | 19 | 26 | 63 | 99 | 82 | 96 | * | 33 | 20 | 33 | 25 | 20 |

TABLE II

ACOUSTICAL INDEX
(Base Foam — Laminate)

| Example No. | Frequency kHz |||||| 
|---|---|---|---|---|---|---|
| | 0.3 | 0.5 | 1.0 | 2.0 | 4.0 | 6.4 |
| 1 | −2 | +1 | +3 | −5 | +7 | −5 |
| 2 | +3 | +4 | +12 | 0 | +3 | −2 |
| 3 | +2 | +1 | +4 | 0 | +2 | +5 |
| 4 | −1 | +2 | +2 | −6 | +1 | +1 |
| 5 | +4 | +4 | +3 | −2 | +1 | −2 |
| 6 | +2 | +1 | +4 | 0 | +2 | +5 |
| 7 | +6 | +17 | −3 | +9 | +2 | −10 |
| 8 | +3 | +8 | +18 | +34 | +21 | −5 |
| 9 | +15 | +34 | −12 | −33 | +12 | −6 |
| 10 | +8 | +11 | +27 | −10 | −7 | −29 |
| 11 | +9 | +6 | +13 | +5 | +1 | +3 |
| Comp. A | −11 | +18 | −58 | −45 | −55 | −57 |
| Comp. B | * | +7 | −43 | −66 | −57 | −76 |

What is claimed is:

1. An acoustical film-to-foam laminate comprising an open cell foam having a deformable film, said foam having a surface embossed with a non-random, predetermined pattern having crowns, sidewalls and valleys, the deformable film being adhesively attached to the embossed surface of the foam, conforming to the pattern on the embossed surface and having perforations through the film predominately in the sidewalls and valleys of the pattern, said valleys having a depth of at least 1/160 of an inch.

2. The laminate of claim 1 having an irregular surface on the crowns caused by said film conforming to the cellular structure defining the surface of the foam on crowns of the pattern.

3. The product of claim 1 wherein the foam is polyurethane foam having from about 40 to about 90 pores per square inch and the film is a polyurethane film having a thickness of from 1/10 mil. to 20 mils.

4. The product of claim 2 wherein the film thickness is from about 4 to about 8 mils. thick and the foam has about 70 pores per square inch and a thickness of from about ⅛ inch to about 3 inches.

5. The product of claim 1 wherein the film material is aluminum foil.

* * * * *